United States Patent
Li et al.

(10) Patent No.: US 9,647,606 B2
(45) Date of Patent: May 9, 2017

(54) COUNTER BASED CIRCUIT FOR MEASURING MOVEMENT OF AN OBJECT

(71) Applicant: FREESCALE SEMICONDUCTOR, INC., Austin, TX (US)

(72) Inventors: Shunan Li, Shanghai (CN); Xuwei Zhou, Shanghai (CN); Wanfu Ye, Shanghai (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 10 days.

(21) Appl. No.: 14/887,338

(22) Filed: Oct. 20, 2015

(65) Prior Publication Data
US 2016/0320205 A1   Nov. 3, 2016

(30) Foreign Application Priority Data
Apr. 29, 2015   (CN) .......................... 2015 1 0325844

(51) Int. Cl.
| | |
|---|---|
| *H02P 31/00* | (2006.01) |
| *G01D 5/14* | (2006.01) |
| *G01D 5/245* | (2006.01) |
| *H02P 6/16* | (2016.01) |

(52) U.S. Cl.
CPC .......... *H02P 31/00* (2013.01); *G01D 5/2451* (2013.01); *H02P 6/16* (2013.01)

(58) Field of Classification Search
CPC .................................. G01D 5/14; H02P 31/00
See application file for complete search history.

(56) References Cited

U.S. PATENT DOCUMENTS

| | | | | |
|---|---|---|---|---|
| 5,894,210 A | * | 4/1999 | Brown | ................ H02P 25/0925 318/400.12 |
| 6,300,884 B1 | * | 10/2001 | Wilson | .................. H03M 1/303 318/560 |
| 6,819,074 B2 | | 11/2004 | Yoo | |
| 2007/0108966 A1 | | 5/2007 | Kim | |
| 2008/0303468 A1 | * | 12/2008 | Muller | .................... G01P 3/481 318/461 |
| 2009/0058338 A1 | * | 3/2009 | Takeuchi | .................. H02P 6/16 318/400.13 |
| 2010/0156336 A1 | | 6/2010 | Ting et al. | |

(Continued)

OTHER PUBLICATIONS

Yucheng Bai, Xiaoqi Tang, Jihong Chen and Fangyu Peng, "Research on Ultra-Low Speed Control of PMSM in Servo System", Proceedings of the 7th World Congress on Intelligent Control and Automation Jun. 25-27, 2008, Chongqing, China.

*Primary Examiner* — Kawing Chan
(74) *Attorney, Agent, or Firm* — Charles E. Bergere

(57) ABSTRACT

An apparatus for measuring movement of an object has a quadrature incremental encoder for providing first and second phases of encoder pulses corresponding to incremental displacements of the object. A first counter counts edges of the encoder pulses according to the sense of the displacement. Clock pulse counts are also made. Acquiring movement data at periodic speed processing moments includes the decoder adjusting encoder pulse data from the first counter using a clock pulse count that is a function of a lapse of time between when the most recent edge of the encoder pulses and the speed processing moment. The clock pulse counts are reset by edges of the first and second phases of the encoder pulses when the decoder acquires the movement data.

19 Claims, 10 Drawing Sheets

(56) References Cited

U.S. PATENT DOCUMENTS

2015/0061563 A1* 3/2015 Jang ............... H02P 7/0094
  318/490
2016/0054351 A1* 2/2016 Dunbar ............. G01P 13/045
  324/207.25

* cited by examiner

COUNTER BASED CIRCUIT FOR MEASURING MOVEMENT OF AN OBJECT

BACKGROUND

The present invention is directed to a circuit for measuring movement of an object and, more particularly, to a counter based circuit for measuring movement of an object, even at slow speeds.

Electronic measurement of movement typically uses an encoder to acquire data concerning the position and speed of a moving object. The movement may be rotary or linear. For example, the moving object may be a driven part of a motor whose speed and/or position may be controlled as a function of the data acquired from the encoder.

An incremental encoder typically provides pulse signals at incremental displacements of the moving object. A quadrature encoder has two output pulse signals (A and B) spaced apart by a quarter cycle, in order to enable the sense of movement (positive or negative) to be distinguished.

At high speeds, the number of encoder pulses occurring in a measurement interval may be counted ('M' method), while at low speeds, the number of clock pulses occurring between successive encoder pulses may be counted ('T') method, and it is possible to combine the techniques ('M/T' method). However, if the interval between successive encoder pulses is longer than the periodicity of processing the movement data, such as a speed control period, the result of the measurement may be erroneous due to the detection dead time. Increasing the processing period reduces the minimum speed that can be measured accurately but the performance of processing, especially of speed or position control, will deteriorate. Increasing the density of encoder pulses by increasing the number of encoder lines, for example, increases the cost of the encoder.

A conventional speed measurement method triggers a capture interrupt to process the movement data from the encoder and calculate the speed. A conventional control method triggers a control interrupt to perform the control algorithm based on the calculated speed. The capture and control interrupts are independent. If the control interrupt has priority, the control algorithm risks using out-of-date movement data, whereas if the capture interrupt has priority, the control algorithm risks exceeding the maximum time allowed, disturbing the movement control.

It would be advantageous to have a technique for improving the precision of measuring movement, even at slow speeds, without increasing the cost of an encoder and without introducing interrupts additional to the control interrupts in the processing of the data.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
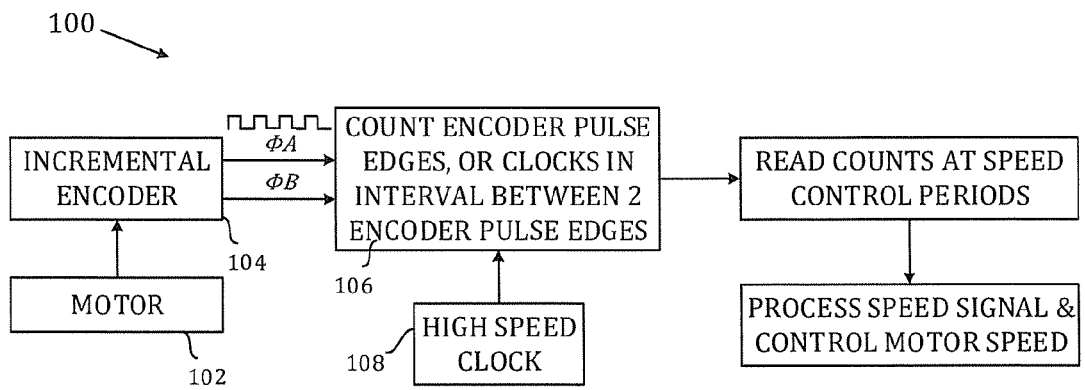
FIG. 1 is a schematic block diagram of a conventional apparatus for measuring and controlling movement of an object.

FIG. 1 illustrates a conventional apparatus 100 for controlling movement of an object (not shown coupled to the drive shaft of a motor 102, and which has a quadrature incremental encoder 104. The encoder 104 provides output pulse signals φA and φB at incremental displacements of the moving object. The output pulse signals φA and φB are spaced apart by a quarter cycle of the pulse signals, in order to enable the sense of movement (positive or negative) to be distinguished.

A movement measurement module 106 either, at high speeds, counts the number of encoder pulse edges occurring in a measurement interval ('M' method) or, at low speeds, counts the number of clock pulses from a high speed clock 108 occurring between successive encoder pulses ('T') method. However, if the interval between successive encoder pulse edges is longer than the periodicity of processing the movement data, the result of the measurement may be erroneous due to the detection dead time. Increasing the processing period would degrade the performance of processing, especially of speed or position control, whereas increasing the number of encoder lines would increases the cost of the encoder. In addition, it is important to prevent the control algorithm from using out-of-date movement data if the control interrupt has priority, on one hand, and the control algorithm exceeding the maximum time allowed, disturbing the movement control, if the capture interrupt has priority, on the other hand.

Figure 2:
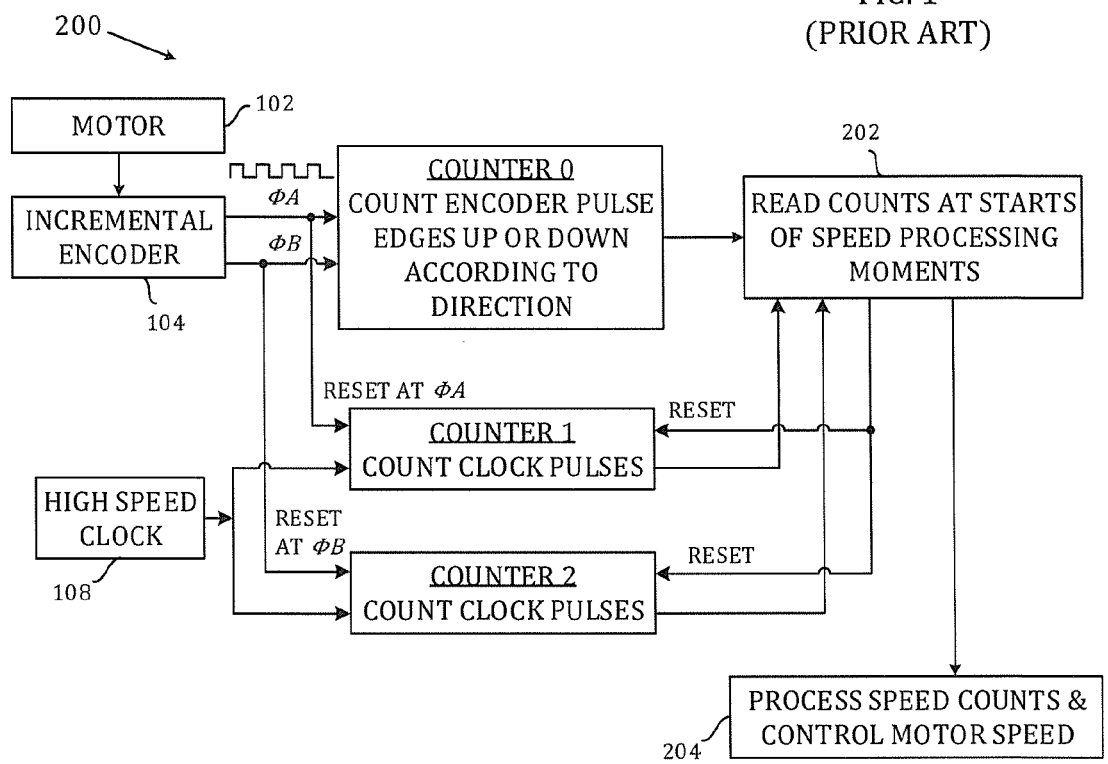
FIG. 2 is a schematic block diagram of an apparatus for measuring and controlling movement of an object in accordance with an embodiment of the present invention.

Referring now to FIG. 2 an apparatus 200 for measuring and controlling movement of an object (not shown) in accordance with an embodiment of the invention is shown. The apparatus 200 has a motor 102 coupled to drive the object and a quadrature incremental encoder 104 for providing first and second phases of encoder pulses φA and φB corresponding to incremental displacements of the object. The apparatus 200 comprises a first counter COUNTER_0 for providing encoder pulse counts T0 according to the sense of the displacement. The apparatus 200 also comprises a clock 108 for providing clock pulses CLOCK at a defined frequency. The apparatus also includes at least one further counter, which in this case comprises second and third counters COUNTER_1 and COUNTER_2 for providing clock pulse counts. A decoder 202 is connected to the counters and acquires movement data W(k), W(k−n) at periodic speed processing moments k, (k−n) as a function of the encoder pulse counts T0 and the clock pulse counts.

The clock pulse counts are reset by the first and second phases of the encoder pulses ϕA and ϕB respectively, when the decoder 202 acquires the movement data W(k), W(k−n). The decoder 202 acquiring movement data W(k), W(k−n) includes adjusting encoder pulse data E(k)=T0(k)−T0(k−1) from the first counter COUNTER_0 using a clock pulse count X(k), where the count X(k) is a function of a lapse of time T1(k), T2(k), T1(k−n), T2(k−n) between when the most recent edge of the encoder pulses ϕA and ϕB has occurred and the speed processing moment k, (k−n) when the decoder 202 acquires the movement data.

The same periodic moments are used for the decoder 202 to acquire movement data W(k), W(k−n) and adjust encoder pulse data E(k)=T0(k)−T0(k−1), as well as for speed processing, which may include calculation and control of the speed. No additional interrupts are necessary.

The second and third counters COUNTER_1 and COUNTER_2 provide the clock pulse counts T1, T2 respectively. The second and third counters COUNTER_1 and COUNTER_2 are reset by the first and second phases of the encoder pulses respectively and only the smaller count T1 or T2 is used.

When an edge of an encoder pulse ϕA, ϕB has occurred since the previous speed processing moment (k−1), the decoder 202 acquiring movement data W(k) adjusts encoder pulse data E(k) from the first counter COUNTER_0 using a clock pulse count X(k) that is a function of a lapse of time T1(k), T2(k) between when the most recent edge of the encoder pulses ϕA, ϕB and the current processing moment k. When an edge of an encoder pulse ϕA, ϕB has occurred since the previous speed processing moment (k−1), the decoder 202 adjusting encoder pulse data E(k) from the first counter COUNTER_0 increases the value of speed measured W(k) as a function of the lapse of time T1(k), T2(k) between the most recent edge of the encoder pulses ϕA, ϕB and the current processing moment k.

The decoder 202 adjusting encoder pulse data E(k) from the first counter COUNTER_0 decreases the value of speed measured W(k) as a function of the lapse of time T1(k−n), T2(k−n) between a most recent edge of the encoder pulses ϕA, ϕB and a previous processing moment (k−n).

When no edge of an encoder pulse ϕA, ϕB has occurred since the previous speed processing moment (k−1), the decoder 202 acquiring movement data W(k) uses a count of the number N of speed processing moments since the most recent edge of the encoder pulses ϕA, ϕB.

When the direction of movement has changed since the previous processing moment (k−1), the decoder 202 adjusts the value of speed measured W(k) to zero.

When no edge of an encoder pulse ϕA, ϕB has occurred since the previous speed processing moment (k−1), and the time since the previous encoder pulse ϕA, ϕB in a current processing moment k is less than the time since a preceding encoder pulse and the previous processing moment (k−n), the decoder leaves the value of speed measured W(k−n) unchanged.

When the number N of speed processing periods with no edges of encoder pulses ϕA, ϕB in a current processing moment k exceeds a limit $N_{MAX}$, the decoder 202 adjusts the value of speed measured W(k) to zero.

The apparatus 200 may include a control module 204 for controlling the motor 102 as a function of the movement data W(k) from the decoder 202.

Figure 12:
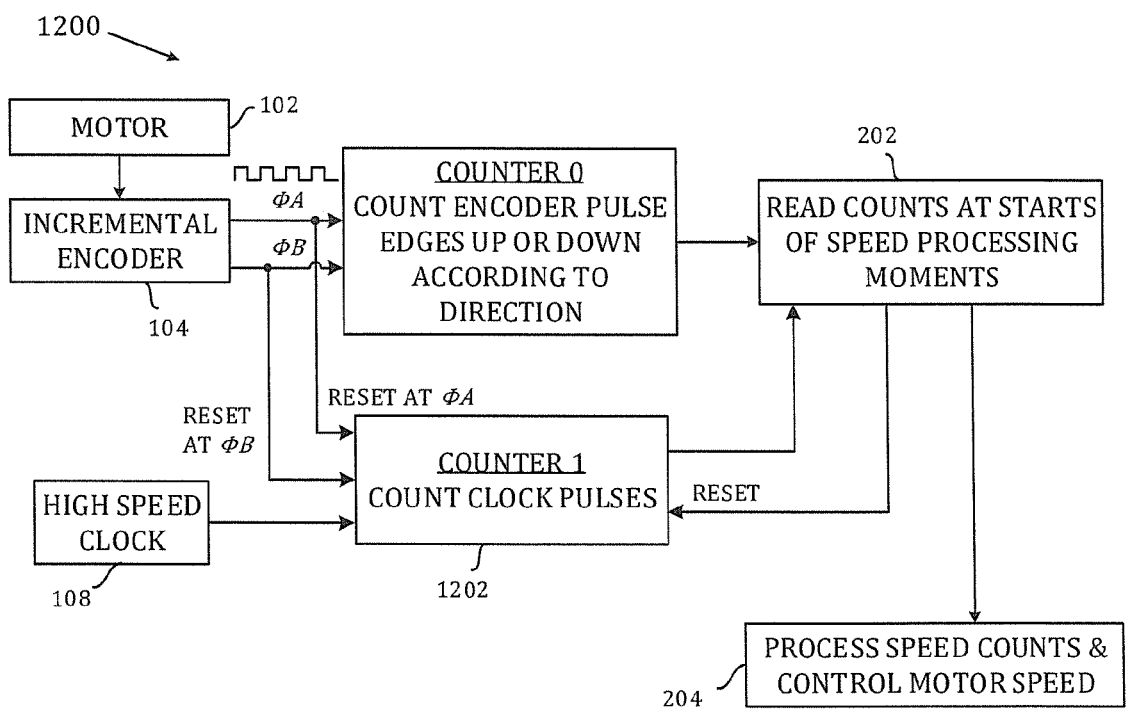
FIG. 12 is a schematic block diagram of another apparatus for measuring and controlling movement of an object in accordance with an embodiment of the present invention.

Referring to FIG. 12, an apparatus 1200 for measuring and controlling movement of an object (not shown) in accordance with another embodiment of the invention is shown. The apparatus 1200 is similar to the apparatus 200 except that the apparatus 1200 has the further counter comprises a common counter 1202 that provides the clock pulse counts. The common counter 1202 is reset by the first and second phases of the encoder pulses ϕA and ϕB when the decoder acquires the movement data. The count of the common counter 1202 is saved before being reset when the decoder 202 acquires the movement data W(k), W(k−n). The saved count of the common counter 1202 is equivalent to the smaller count T1 or T2 of the second and third counters COUNTER_1 and COUNTER_2 of the apparatus 200.

Embodiments of the invention also include methods 800, 900 (FIGS. 8 and 9) and 1500 (FIG. 15) of measuring and controlling movement of an object, and of operating the apparatus 200, 1200, examples of which are described below in more detail with reference to FIGS. 3 to 11 and 13 to 15.

In more detail, the apparatus 200, 1200 and methods 800, 900, 1500 are described below as used to measure and control movement in rotation. However, embodiments of the invention can also be used to measure and control linear movement. The apparatus 200, 1200 and methods 800, 900, 1500 can be used to measure and control the speed, as described below, and also the position of the driven object.

Figure 3:
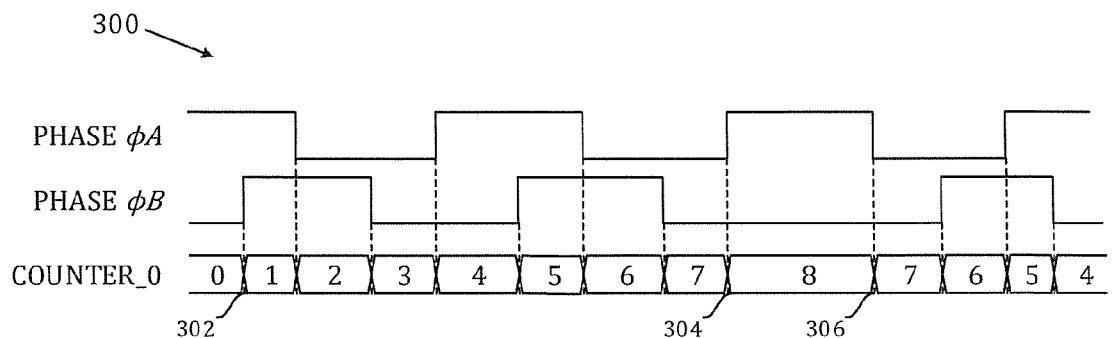
FIGS. 3 to 7 are graphs against time of signals appearing in a method of measuring and controlling movement of an object in accordance with an embodiment of the present invention.

FIG. 3 shows graphs 300 against time of quadrature encoder pulses ϕA and ϕB from the encoder 104 for an example of incremental displacements of the driven object and having phase differences of a quarter cycle. The count of the first counter COUNTER_0 counting edges of the encoder pulses ϕA and ϕB is also shown. From 302 to 304, the movement of the driven object continues in the same direction, the signal of phase ϕA precedes phase ϕB by a quarter cycle, and the count of the first counter COUNTER_0 increases monotonically. However, between 304 and 306 the direction of movement reverses, with the signal of phase ϕB preceding phase ϕA after 306 by a quarter cycle, and the count of the first counter COUNTER_0 now decreases.

Figure 4:
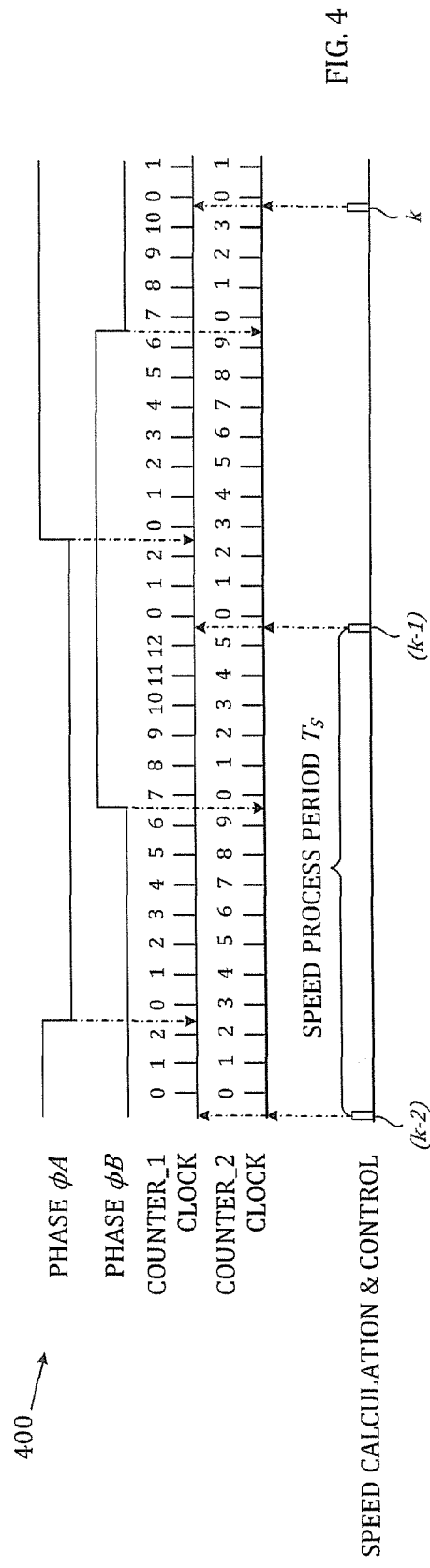

FIG. 4 shows graphs 400 against time of the quadrature encoder pulses ϕA and ϕB from the encoder 104, clock pulses CLOCK from the clock 108, the counts T1, T2 of the second and third counters COUNTER_1 and COUNTER_2, and speed processing moments k, (k−1) and (k−2) when the decoder 202 acquires the movement data W(k). As shown by the dot-dashed arrows, the count T1 of the second counter COUNTER_1 is reset to zero by edges of the encoder pulses ϕA, and the count T2 of the third counter COUNTER_2 is reset to zero by edges of the encoder pulses ϕB. Both the counts T1, T2 of the second and third counters COUNTER_1 and COUNTER_2 are also reset to zero at the speed processing moments k, (k−1) and (k−2) when the decoder 202 acquires the movement data W(k). Accordingly, the second and third counters COUNTER_1 and COUNTER_2 count the number of clock pulses CLOCK occurring between an edge of an encoder pulse ϕA or ϕB respectively and a speed processing moment k.

The decoder 202 reads the values in all the counters COUNTER_0, COUNTER_1 and COUNTER_2 at the beginning of each speed processing moment k. This ensures that the speed sampling interval $T_s$ is constant. The change in count E(k)=[T0(k)−T0(k−1)] of the counter COUNTER_0 is the number of encoder pulse edges occurring in the speed sampling interval $T_s$ and represents a coarse measure of the movement of the driven object in the speed sampling interval $T_s$. The counts T1, T2 of the second and third counters COUNTER_1 and COUNTER_2 represent the time intervals between the latest edges of an encoder pulse ϕA or ϕB and the speed processing moments k. These time intervals are updated at every speed processing moment k and used as a fine adjustment to the speed sampling interval $T_s$. Accordingly, the time interval between the latest edge of an encoder pulse φA or φB before the previous speed processing moment (k−1) and the latest edge of an encoder pulse φA or φB before the present speed processing moment k can be calculated more accurately. The speed is calculated just before executing speed control algorithms, so that the speed measurement is updated timely and also avoids any additional interrupt.

When the real speed becomes lower than the minimal speed without detection dead time, the spacing between two successive edges of encoder pulses φA or φB becomes longer than the speed sampling interval $T_s$. The measured speed can still be updated by a unified calculation through the timer counts T1, T2 of the second and third counters COUNTER_1 and COUNTER_2, which continue to provide measurement information relating to the speed even when the actual speed becomes very low. In contrast, the speed calculated by the conventional apparatus 100 remains unchanged in this case. For example, the minimal measured speed with no detection dead time is 30 RPM (revolutions per minute) in a case where the encoder 104 has 1000 lines and the speed control period is 0.5 ms (milliseconds). Once the real speed becomes less than 30 RPM, the time interval between two adjacent encoder pulses exceeds 0.5 ms, the measured speed of the conventional apparatus 100 remains unchanged, and it may deviate a lot from the actual speed. There is a need for the speed measurement and control apparatus 200, 1200 where the measurement and control of very low speeds is more accurate, without increasing the number of lines on the encoder 104 and without increasing the speed measurement and control period. For example, there is a demand for speed measurement and control apparatus 200 where the encoder has 1000 lines, the speed control period $T_S$ is 0.5 ms and the apparatus 200 is capable of stable speed control down to 1 RPM or even 0.5 RPM.

Figure 5:
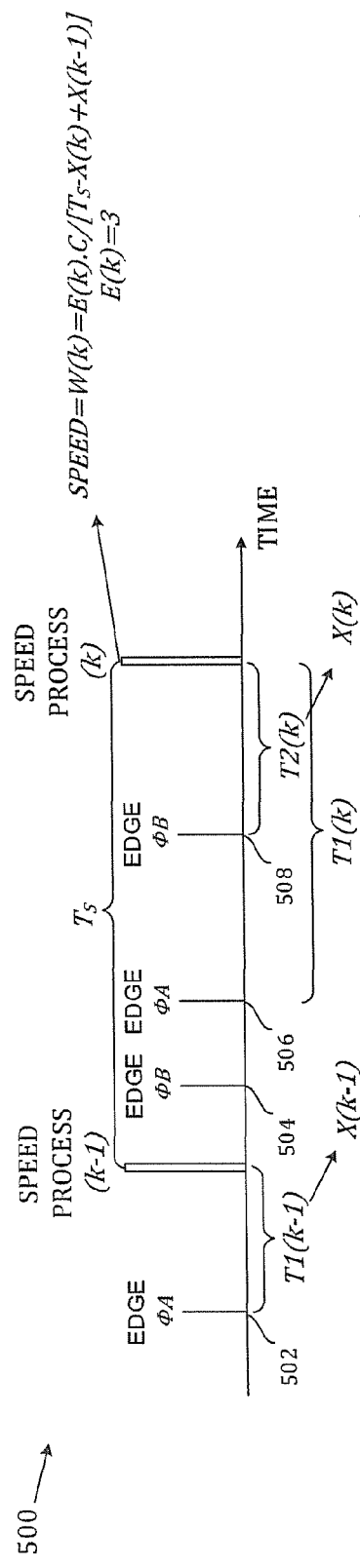

FIG. 5 illustrates an example of a situation 500 in which edges of encoder pulses φA and φB occur in successive speed processing periods. An edge 502 of an encoder pulse φA occurs a time interval T(k−1) before the speed processing moment (k−1). Since this is the most recent edge of an encoder pulse, the value X(k−1) used for the speed calculation at the speed processing moment k is set equal to the count in the second counter COUNTER_1 that represents the lapse of time T1(k−1) between the edge 502 and the speed processing moment (k−1). In the following speed processing period, three edges 504, 506 and 508 of encoder pulses φA or φB occur before the following speed processing moment k. The most recent edge 508 (encoder pulse φB) before the speed processing moment k is selected and the value X(k) used for the speed calculation at the speed processing moment k is set equal to the count in the third counter COUNTER_2 that represents the lapse of time T2(k) between the edge 508 and the speed processing moment k. The calculation of the speed is then performed by an algorithm that gives the result of the equation:

$$\text{SPEED} = W(k) = \frac{E(k)}{[T_S - X(k) + X(k-1)]} \cdot C$$

$$E(k) = T0(k) - T0(k-1) = 3$$

where E(k) is the change in the count of the first counter COUNTER_0 between the speed processing moments (k−1) and k, and C is a coefficient that is constant. E(k) equals the number of edges of encoder pulses φA or φB that occur in the speed processing period (k).

Figure 6:
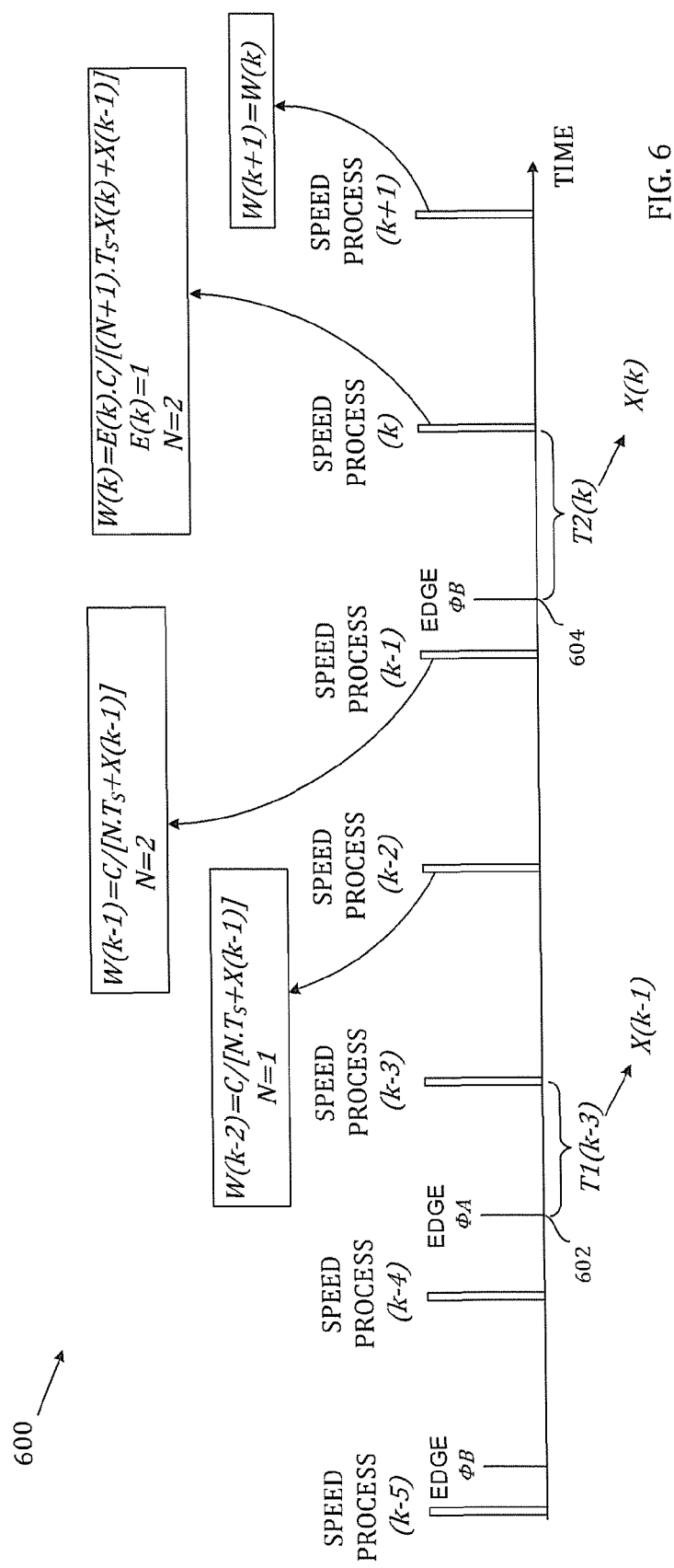

FIG. 6 illustrates an example of a situation 600 in which the speed of the driven object is getting slower than in situation 500. An edge 602 of an encoder pulse φA occurs a time interval T1(k−3) before the speed processing moment (k−3). Since this is the most recent edge of an encoder pulse, the value X(k−1) used for the speed calculation at the speed processing moment k is set equal to the count in the second counter COUNTER_1 that represents the lapse of time T1(k−3) between the edge 602 and the speed processing moment (k−3). No edges of encoder pulses φA or φB occur in the following two speed processing periods (k−2) and (k−1), until the speed processing period k, when an edge 604 of an encoder pulse φB occurs a time interval T2(k) before the speed processing moment k. The value X(k) used for the speed calculation at the speed processing moment k is set equal to the count in the third counter COUNTER_2 that represents the lapse of time T2(k) between the edge 604 and the speed processing moment k. The calculation of the speed is then performed at successive speed processing periods (k−2), (k−1) and k, by algorithms that give the results of the equations:

$$W(k-2) = \frac{1}{[N \cdot T_S + X(k-1)]} \cdot C$$

$$N = 1;$$

$$W(k-1) = \frac{1}{[N \cdot T_S + X(k-1)]} \cdot C$$

$$N = 2;$$

and $$W(k) = \frac{E(k)}{[(N+1) \cdot T_S - X(k) + X(k-1)]} \cdot C$$

$$E(k) = 1$$

$$N = 2;$$

where N=number of speed processing periods with no edges of encoder pulses (T0 has not changed and E(k)=0).

Figure 11:
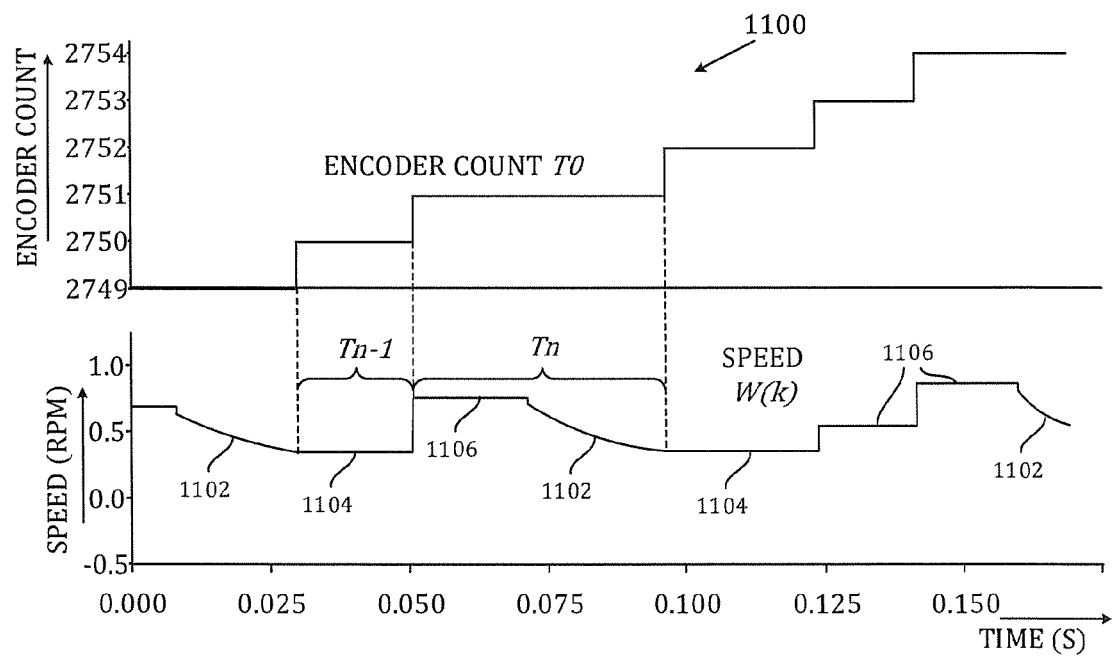

Accordingly, the measurement of speed W(k) does not remain unchanged in the absence of encoder pulse edges during the periods preceding speed processing moments (k−2) and (k−1), like it does with the apparatus 100, but reduces progressively (as shown at 1102 in FIG. 11). During the period preceding speed processing moment (k+1), no encoder pulse edge occurs, and the measurement of speed W(k+1) initially remains unchanged, as shown at 1104 in FIG. 11, since the measurement is unaware whether the actual speed is increasing, staying constant or decreasing in the absence of any encoder pulse. When an encoding pulse does next occur in a period preceding a subsequent speed processing moment (k+n), the measurement of speed W(k+n) is recalculated as shown at 1106 in FIG. 11. However, the measurement of speed then reduces progressively in subsequent speed processing periods 1102 if no encoder pulse edge occurs.

Figure 7:
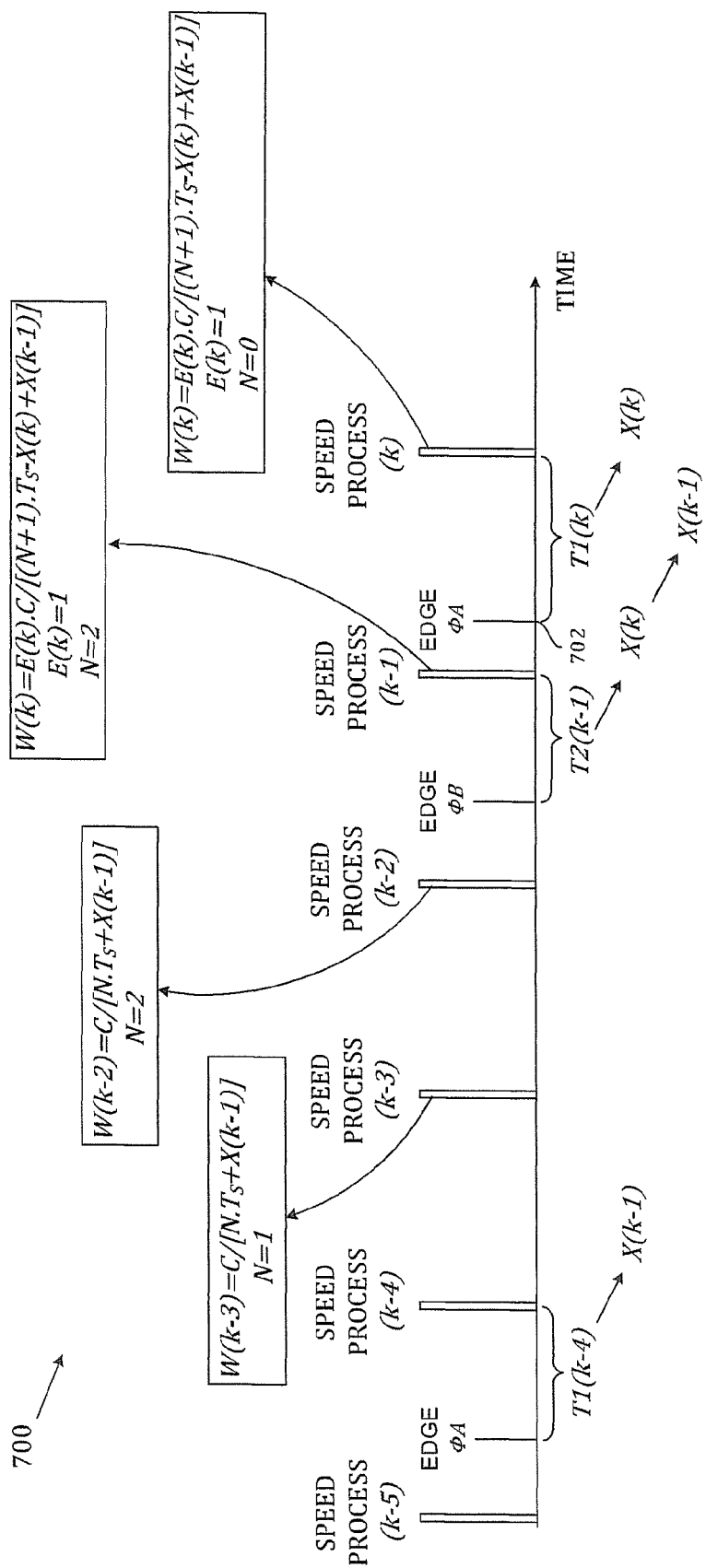

FIG. 7 illustrates an example of a situation 700 similar to the situation 600, but in which the speed of the driven object does increase again. Speed processing moments (k−4), (k−3), (k−2) and (k−1) in situation 700 are similar to speed processing moments (k−3), (k−2) (k−1) and k in situation 600. However, an edge 702 of an encoder pulse φA occurs a time interval T1(k) before the speed processing moment k. Since this is the most recent edge of an encoder pulse, the value X(k) used for the speed calculation at the speed processing moment k is set equal to the count in the second counter COUNTER_1 that represents the lapse of time T1(k) between the edge 702 and the speed processing moment k. The calculation of the speed is then performed by an algorithm that gives the result of the equation:

$$W(k) = \frac{E(k)}{[(N+1) \cdot T_S - X(k) + X(k-1)]} \cdot C$$

$$E(k) = T0(k) - T(0)(k-1) = 1$$

$$N = 0$$

The measured speed W(k) is recalculated at the speed processing moment k.

Figure 8:
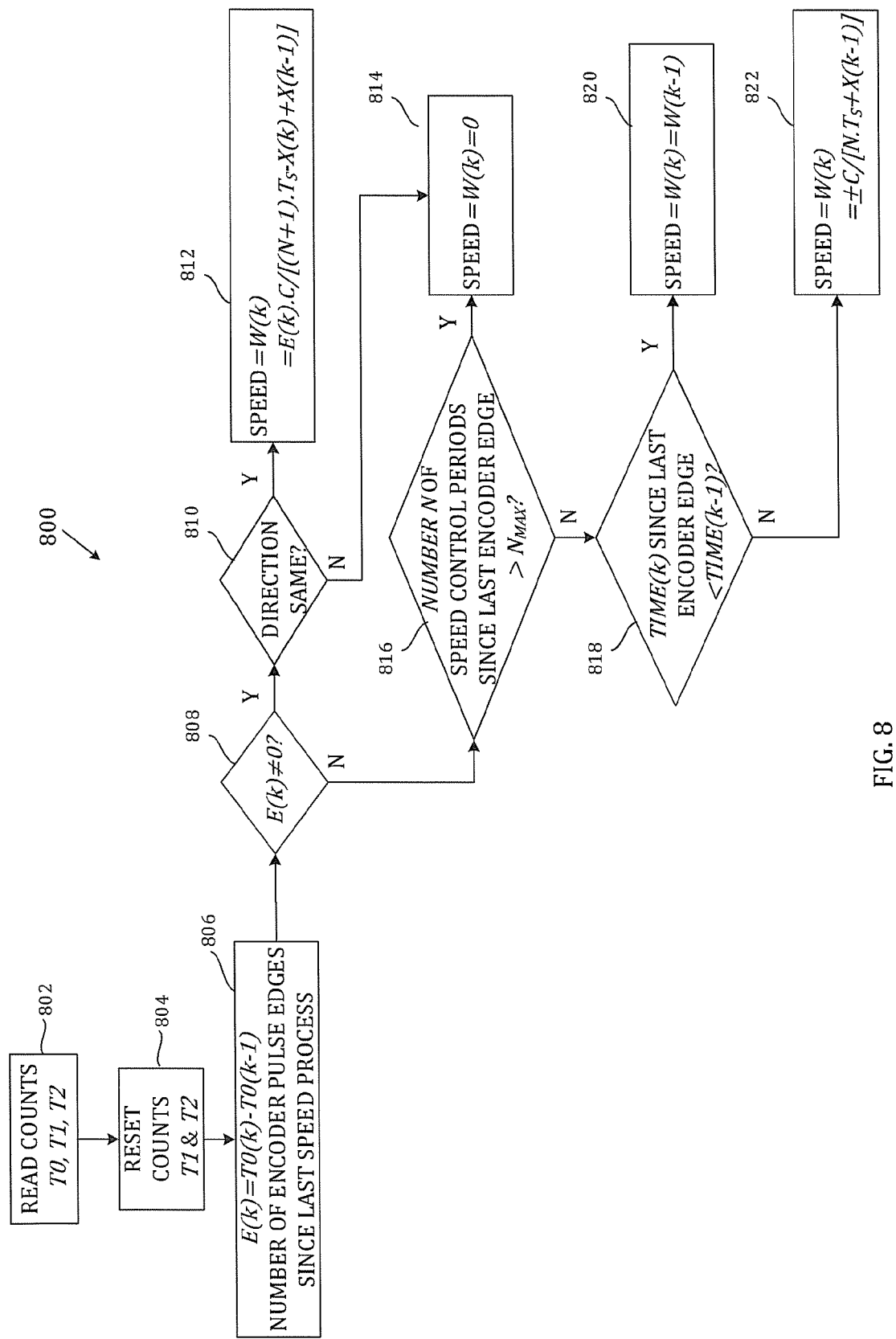
FIGS. 8 and 9 are flow charts illustrating a method of measuring and controlling movement of an object in accordance with an embodiment of the invention.
Figure 9:
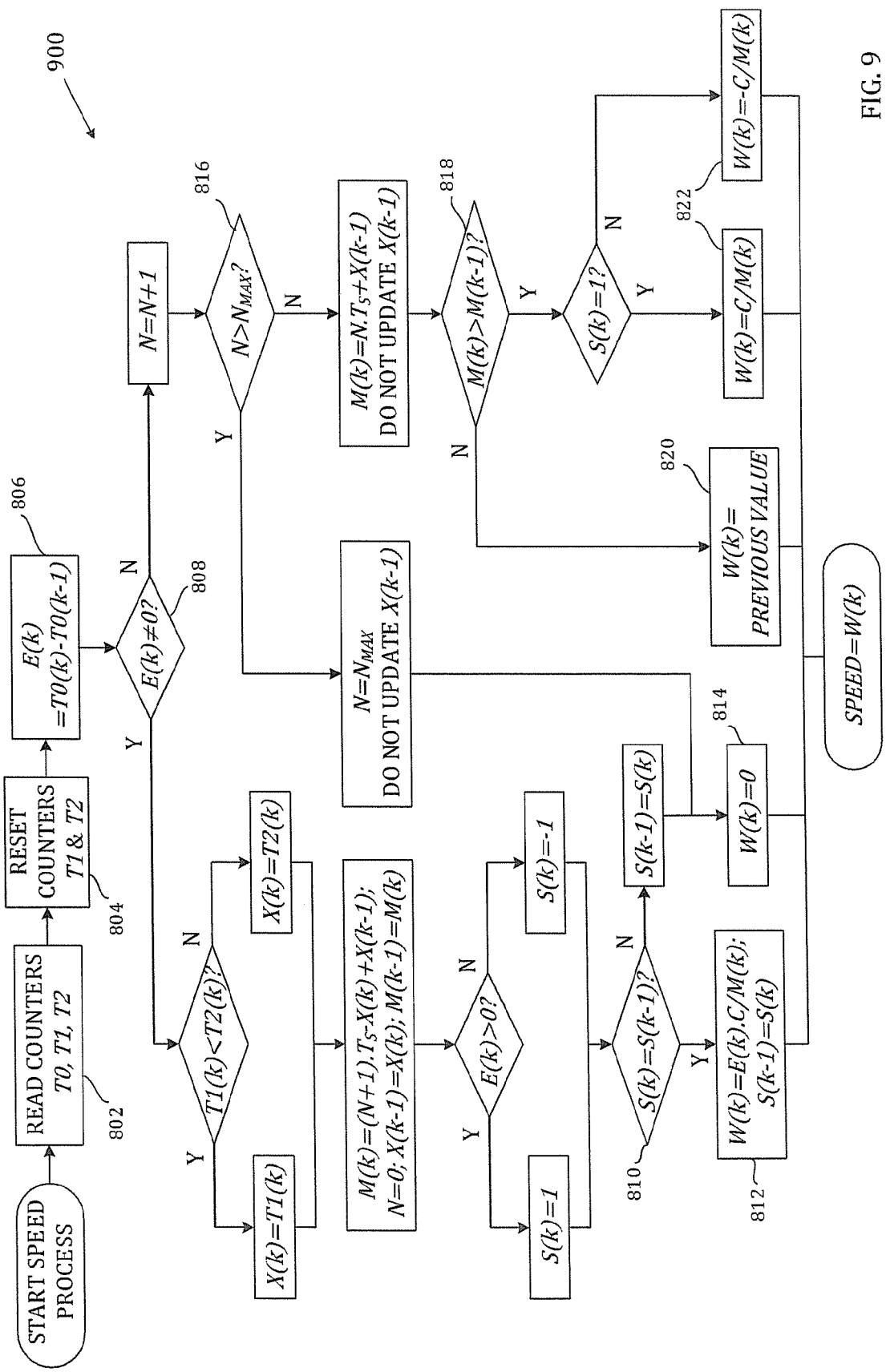

FIG. 8 is a flow chart illustrating a method 800 of measuring and controlling movement of an object, and of operating the apparatus 200, and FIG. 9 is a flow chart illustrating in more detail an example 900 of the method 800. At 802, at the speed processing moment k, the first, second and third counts T0, T1 and T2 are read, and at 804 the second and third counts T1 and T2 are reset to zero. At 806, the number E(k)=T0(k)–T0(k–1) of edges of encoder pulses φA and φB that have occurred since the previous speed processing moment (k–1) is calculated.

At 808, the process branches. If E(k) is different from zero, a decision is taken at 810 whether the direction of movement of the driven object is still the same as at the previous speed processing moment (k–1). If the direction of movement (as detected by the order in which the quadrature phases φA, φB occur) is still the same, corresponding to the case illustrated in the situation 500, the value W(k) of the speed is calculated by the equation shown at 812. If at 810, the direction of movement of the driven object has changed since the previous speed processing moment (k–1), the value W(k) of the speed is set to zero at 814.

If at 808, E(k) is equal to zero (as shown in the situation 600 at (k–2) and (k–1), and in the situation 700 at (k–3) and (k–2)) the process branches at 816. If at 816 the time (represented by the count of the number N of speed processing moments) since the previous encoder pulse φA, φB at the current processing moment k exceeds a limit $N_{MAX}$, the value W(k) of the speed is set to zero at 814. If at 816 the number N of speed processing moments since the previous encoder pulse φA, φB is less than the limit $N_{MAX}$, the process branches at 818. If at 818 the time M(k)=(N·T_s+X(k–1)) since the previous encoder pulse φA, φB at the current processing moment k is less than the equivalent time M(k–1) at the last previous processing moment when E(k) was zero, the value W(k) of the speed is left unchanged at W(k–1) at 820. If at 818 the time M(k) since the previous encoder pulse φA, φB at the current processing moment k is greater than the equivalent time M(k–n) at the previous processing moment (k–n), the value W(k) of the speed is recalculated by the equation shown at 822, positive or negative according to the direction of movement.

Figure 10:
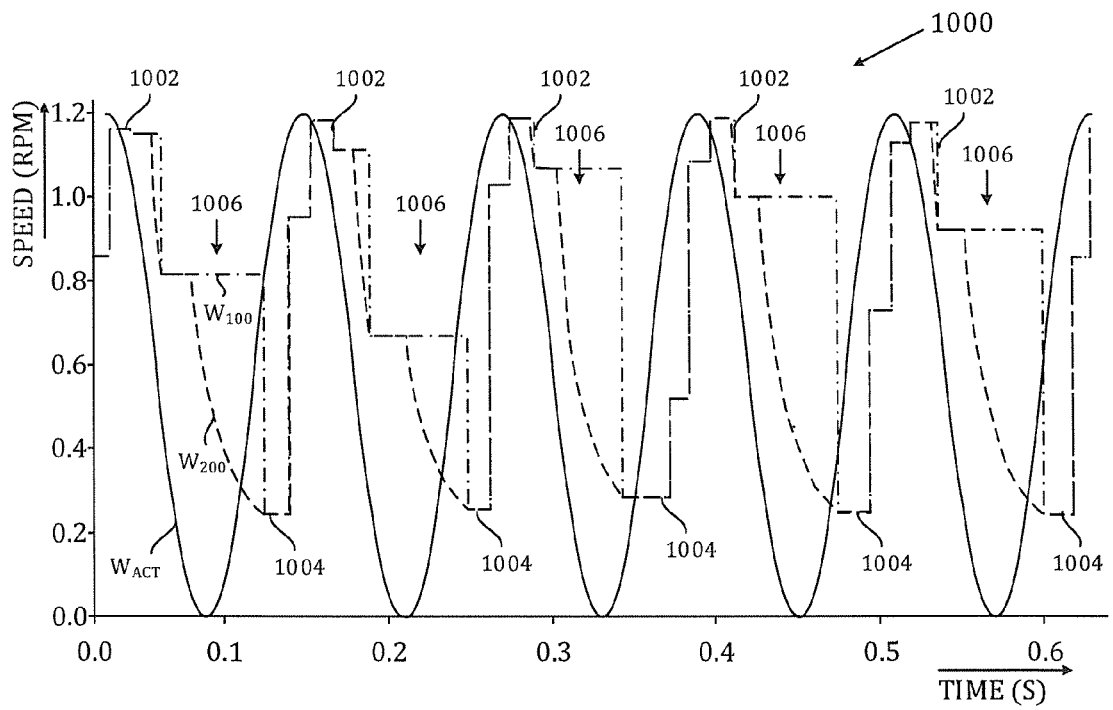
FIGS. 10 and 11 are graphs against time of values obtained using an example of the method of FIGS. 8 and 9 compared with a conventional method.

FIG. 10 illustrates results 1000 obtained with the apparatus 200 and the method 800 compared with the operation of the conventional apparatus 100 for a rotating object. In both cases, the encoder 104 has 1000 lines and the speed processing and control period is 0.5 ms. The actual speed $W_{ACT}$ of the driven object varies sinusoidally between zero and 1.2 revolutions per minute (RPM) with a period of 0.12 s, as shown by the full line graph. The value $W_{100}$ of speed measured by the conventional apparatus 100 is shown by the dot-dashed line graph, and the value $W_{200}$ of speed measured by the apparatus 200 and the method 800 is shown by the dashed line graph.

At moments 1002 and 1004, close to the maximum and minimum values of the actual speed $W_{ACT}$, both the values $W_{100}$ and $W_{200}$ approximate reasonably the actual speed $W_{ACT}$, with an acceptable time lag. However, at times 1006 during its cycle of variation, when the actual speed $W_{ACT}$ is decreasing and the intervals between successive edges of encoder pulses φA or φB is substantially longer than the speed processing and control period, the value $W_{100}$ of the speed measured by the conventional apparatus 100 remains unchanged instead of following the decrease of the actual speed, and deviates considerably from the actual speed $W_{ACT}$. This deviation can lead to instability in speed control as well as error in the controlled steady state speed.

On the other hand, the value $W_{200}$ of speed measured by the apparatus 200 and the method 800 decreases progressively during the intervals 1006 and approximates much better to the actual speed $W_{ACT}$, enabling stable speed control as well as much smaller error in the controlled steady state speed, even down to a speed of 0.5 RPM.

FIG. 11 illustrates results 1100 obtained with the apparatus 200 and the method 800 for a rotating object in a situation where, like the situation 500, the movement is in the same direction but the speed varies. The count T0 of the first counter COUNTER_0 and the measured value $W_{200}$ of speed (illustrated in FIG. 10) are shown in FIG. 11 on the same time scale. At the intervals 1102 between two edges of encoder pulses φA or φB, when the actual speed $W_{ACT}$ is small, the value $W_{200}$ of speed measured by the apparatus 200 and the method 800 decreases progressively during several speed processing periods. At the beginning of the intervals 1104 a single encoder pulse occurs, but during the intervals 1104 the best approximation of the measurement W(k) to the real speed $W_{ACT}$ is unchanged. An encoding pulse does next occur at the end of the intervals 1104 and the speed measurement W(k) is recalculated at the start of the intervals 1106. Subsequently, during further intervals 1106, when no edge of encoder pulses φA or φB occurs, the value $W_{200}$ of speed measured by the apparatus 200 and the method 800 remains unchanged until the time represented by M(k)=(N·T_s+X(k–1)) since the previous encoder pulse φA, φB at the current processing moment k is greater than the equivalent time M(k–1) at the last previous processing moment when E(k) was zero.

FIG. 12 illustrates an apparatus 1200 in accordance with another embodiment of the invention. The apparatus 1200, instead of the second and third counters COUNTER_1 and COUNTER_2 of the apparatus 200, has a common counter 1202 (COUNTER_1). The counter 1202 provides the counts of the numbers of the clock pulses CLOCK, which are reset by edges of both the encoder pulses φA and φB. In addition, the count of the common counter 1202 is registered before being reset when the decoder 202 acquires the movement data W(k), W(k–n). The registered count of the common counter 1202 is equivalent to the smaller count T1 or T2 of the second and third counters COUNTER_1 and COUNTER_2 of the apparatus 200.

Figure 13:
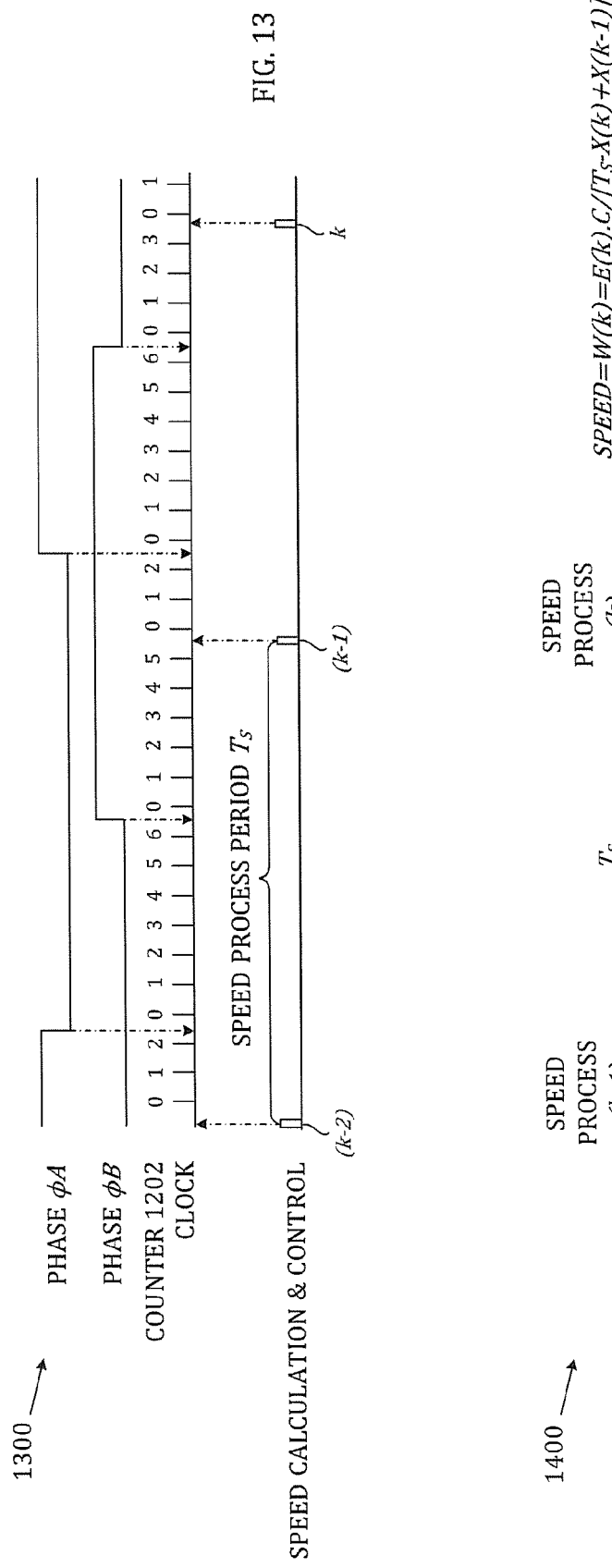
FIGS. 13 and 14 are graphs against time of signals appearing in operation of the apparatus of FIG. 12 in accordance with an embodiment of the invention.

FIG. 13 shows graphs 1300 against time of the quadrature encoder pulses φA and φB from the encoder 104, clock pulses CLOCK from the clock 108, the count of the counter 1202, and speed processing moments k, (k–1) and (k–2) when the decoder 202 acquires the movement data W(k). As shown by the dot-dashed arrows, the count of the counter 1202 is reset to zero by edges of both the encoder pulses φA and φB. The count of the counter 1202 is also reset to zero at the speed processing moments k, (k−1) and (k−2) when the decoder 202 acquires the movement data W(k). Accordingly, the counter 1202 counts the number of clock pulses CLOCK occurring between the last edge of an encoder pulse φA or φB and the speed processing moment k.

Figure 14:
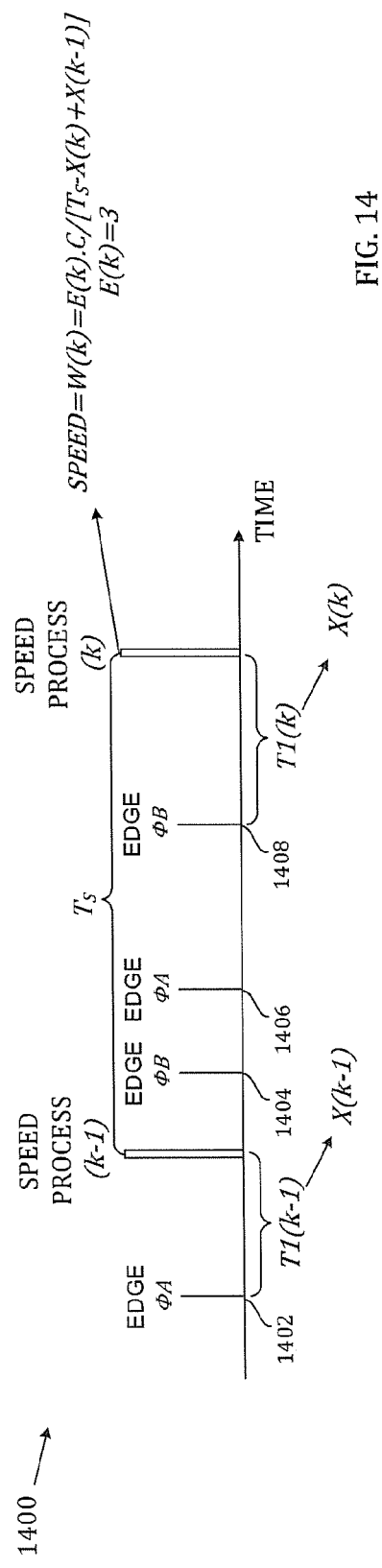

FIG. 14 is a graph of a situation similar to FIG. 5, in operation of the apparatus 1200. Unlike the apparatus 200, at every processing moment including the processing moment k, the count T1(k) of the counter 1202 corresponds to the most recent edge 1408 (phase φB) before the speed processing moment k, and the value X(k) used for the speed calculation at any speed processing moment, including k, is set equal to the count in the counter 1202.

Figure 15:
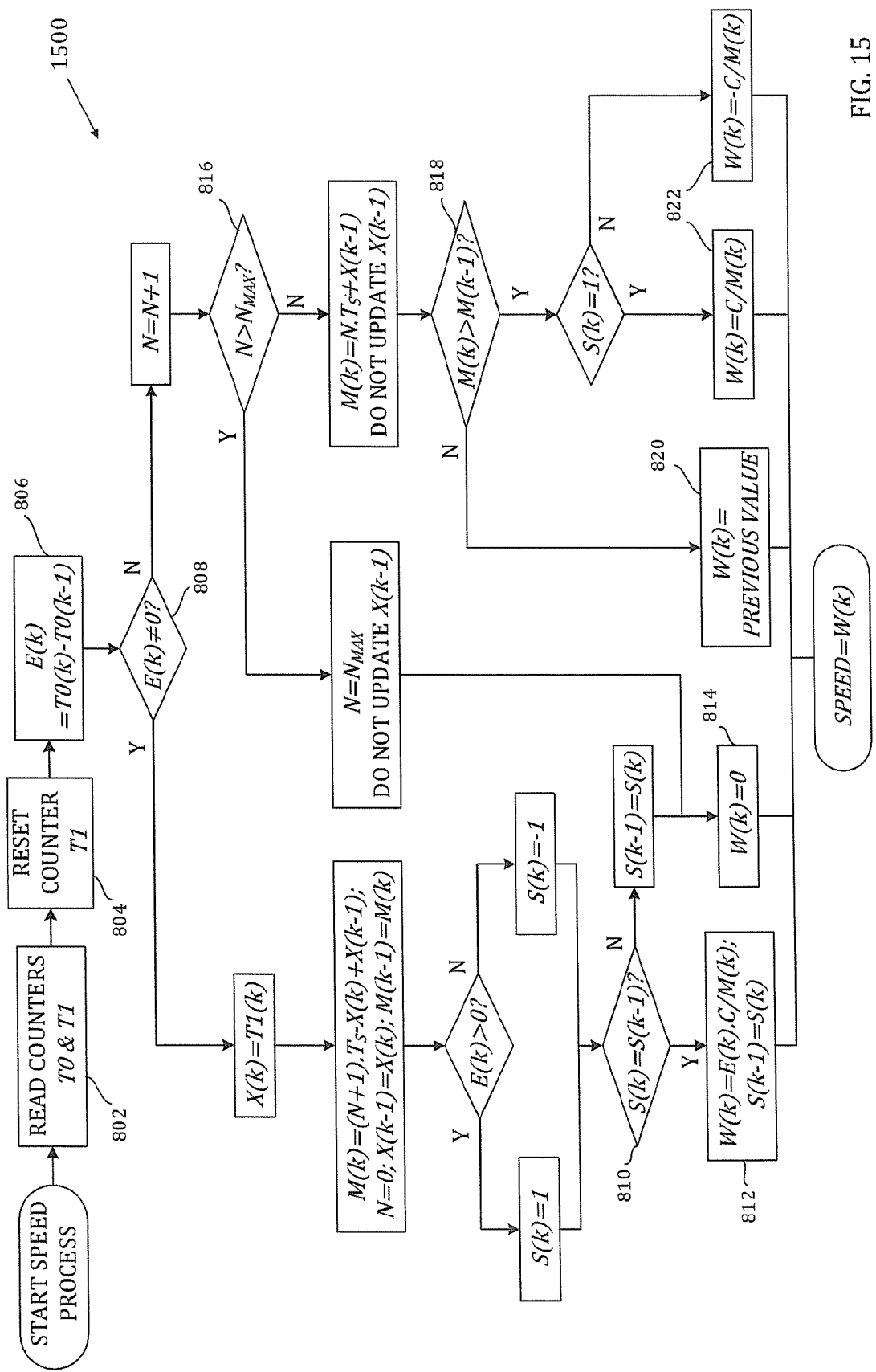
FIG. 15 is a flow chart illustrating operation of the apparatus of FIG. 12 in accordance with an embodiment of the invention, given by way of example.

FIG. 15 is a detailed flow chart for a method 1500 of operation of the apparatus 1202, similar to the methods 800 and 900 of FIGS. 8 and 9, for the apparatus 200. A difference is that, to obtain the value X(k) used for the speed calculation at the speed processing moment k, it is unnecessary to select between the counts of two counters since the count of the counter 1202 already represents the lapse of time T1(k) between the edge 1408 and the speed processing moment k.

The invention may be implemented at least partially in a non-transitory machine-readable medium containing a computer program for running on a processor or computer system, the program at least including code portions for performing steps of a method according to the invention when run on a programmable apparatus, such as a computer system or enabling a programmable apparatus to perform functions of a device or system according to the invention.

The computer program may be stored on an internal memory or transmitted to the computer system via a computer readable transmission medium. All or some of the computer program may be provided on non-transitory computer-readable media permanently, removably or remotely coupled to an information processing system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A measuring apparatus for measuring movement of an object that has a quadrature incremental encoder for providing first and second phases of encoder pulses corresponding to incremental displacements of the object, the measuring apparatus comprising:
   a first counter for providing encoder pulse counts according to a sense of the displacement;
   a clock for providing clock pulses at a defined frequency;
   a further counter connected to the clock for providing clock pulse counts;
   a decoder for acquiring movement data at periodic speed processing moments as a function of the encoder pulse counts and the clock pulse counts,
   wherein the decoder acquiring movement data includes adjusting encoder pulse data from the first counter using a clock pulse count that is a function of a lapse of time between a most recent edge of the encoder pulses and the speed processing moment when the decoder acquires the movement data, and
   wherein the clock pulse counts are reset by the first and second phases of the encoder pulses when the decoder acquires the movement data, and
   a control module for controlling a motor drivingly coupled to the object, wherein the control module controls the motor as a function of the movement data from the decoder.

2. The apparatus of claim 1, wherein the further counter includes second and third counters for providing the clock pulse counts, wherein the second and third counters are reset by the first and second phases of the encoder pulses respectively.

3. The apparatus of claim 1, wherein the further counter is a common counter providing the clock pulse counts, and is reset by the first and second phases of the encoder pulses when the decoder acquires the movement data.

4. The apparatus of claim 1, wherein when an edge of an encoder pulse has occurred since a previous speed processing moment, the decoder acquiring movement data includes adjusting encoder pulse data from the first counter using a clock pulse count that is a function of a lapse of time between the most recent edge of the encoder pulses and the current processing moment.

5. The apparatus of claim 1, wherein when an edge of an encoder pulse has occurred since a previous speed processing moment, the decoder adjusting encoder pulse data from the first counter increases a measured value of speed as a function of the lapse of time between the most recent edge of the encoder pulses and the current processing moment.

6. The apparatus of claim 1, wherein the decoder adjusting encoder pulse data from the first counter decreases the value of speed measured as a function of the lapse of time between a most recent edge of the encoder pulses and a previous processing moment.

7. The apparatus of claim 6, wherein when no edge of an encoder pulse has occurred since the previous speed processing moment, the decoder acquiring movement data includes using a count of the number of speed processing moments since the most recent edge of the encoder pulses.

8. The apparatus of claim 1, wherein when a direction of movement has changed since a previous processing moment, the decoder adjusts the value of speed measured to zero.

9. The apparatus of claim 1, wherein when no edge of an encoder pulse has occurred since a previous speed processing moment, and the time since the previous encoder pulse in a current processing moment is less than the time since a preceding encoder pulse and the previous processing moment, the decoder leaves the value of speed measured unchanged.

10. The apparatus of claim 1, wherein when the number of speed processing periods with no edges of encoder pulses in a current processing moment exceeds a predetermined limit, the decoder adjusts the value of speed measured to zero.

11. A method of measuring movement of an object, wherein a quadrature incremental encoder provides first and second phases of encoder pulses corresponding to incremental displacements of the object, the method comprising:
   providing encoder pulse counts from a first counter according to a sense of the displacement;
   providing clock pulses at a defined frequency by a clock;
   providing clock pulse counts with a further counter;
   acquiring movement data at periodic speed processing moments as a function of the encoder pulse counts and the clock pulse counts using a decoder, including adjusting encoder pulse data from the first counter using a clock pulse count that is a function of a lapse of time between a most recent edge of the encoder pulses and the speed processing moment when the decoder acquires the movement data;
   resetting the clock pulse counts by the first and second phases of the encoder pulses when the decoder acquires the movement data; and
   controlling a motor with a control module, wherein the motor is drivingly coupled to the object, and wherein the control module controls the motor as a function of the movement data from the decoder.

12. The method of claim 11, wherein second and third counters provide the clock pulse counts, wherein the second and third counters are reset by the first and second phases of the encoder pulses respectively.

13. The method of claim 11, wherein when an edge of an encoder pulse has occurred since the previous speed processing moment, acquiring movement data includes adjusting encoder pulse data from the first counter using a clock pulse count that is a function of a lapse of time between a most recent edge of the encoder pulses and the current processing moment.

14. The method of claim 13, wherein when an edge of an encoder pulse has occurred since the previous speed processing moment, adjusting encoder pulse data from the first counter increases the value of speed measured as a function of the lapse of time between the most recent edge of the encoder pulses and the current processing moment.

15. The apparatus of claim 11, wherein adjusting encoder pulse data from the first counter decreases the value of speed measured as a function of the lapse of time between a most recent edge of the encoder pulses and a previous processing moment.

16. The method of claim 15, wherein when no edge of an encoder pulse has occurred since the previous speed processing moment, acquiring movement data includes using a count of the number of speed processing moments since the most recent edge of the encoder pulses.

17. The method of claim 11, wherein when the direction of movement has changed since the previous processing moment, the value of speed measured is adjusted to zero.

18. The method of claim 11, wherein when no edge of an encoder pulse has occurred since the previous speed processing moment, and the time since the previous encoder pulse in a current processing moment is less than the time since a preceding encoder pulse and the previous processing moment, the value of speed measured is left unchanged.

19. The method of claim 11, wherein when the time since the previous encoder pulse in a current processing moment exceeds a predetermined limit, the value of speed measured is adjusted to zero.

* * * * *